United States Patent [19]

Hall

[11] Patent Number: 4,812,359
[45] Date of Patent: Mar. 14, 1989

[54] IMPACT-RESISTANT LAMINATE

[75] Inventor: Christopher W. G. Hall, Redditch, United Kingdom

[73] Assignee: Pilkington Brothers P.L.C., Merseyside, England

[21] Appl. No.: 866,353

[22] Filed: May 23, 1986

Related U.S. Application Data

[63] Continuation-in-part of Ser. No. 718,432, Apr. 1, 1985, abandoned.

[30] Foreign Application Priority Data

Apr. 4, 1984 [GB] United Kingdom ............... 8408665
Jan. 8, 1985 [GB] United Kingdom ............... 8500470

[51] Int. Cl.⁴ .................... B32B 17/10; B32B 27/36
[52] U.S. Cl. .......................................... 428/332; 428/412;
428/425.6; 428/447; 428/437; 428/502;
428/524; 428/911; 52/308; 244/121; 244/129.3;
156/105; 156/106
[58] Field of Search ................................ 156/106, 105

[56] References Cited

U.S. PATENT DOCUMENTS 4,081,581 3/1978 Littell, Jr. ................... 428/911 X
4,328,277 5/1982 Molari, Jr. .................. 428/412 X

FOREIGN PATENT DOCUMENTS 0130886 9/1985 European Pat. Off. .
2134255 8/1972 France .
2265613 10/1975 France .
2185040 12/1983 France .
1394271 5/1975 United Kingdom .
1430987 4/1976 United Kingdom .
1504198 3/1978 United Kingdom .
2011836 7/1979 United Kingdom .
2070045 9/1981 United Kingdom .

Primary Examiner—P. C. Ives
Attorney, Agent, or Firm—Burns, Doane, Swecker & Mathis

[57] ABSTRACT

An impact-resistant laminate has a front glass sheet which receives an impact such as a bullet, and a rear polycarbonate sheet. A thin polycarbonate sheet up to about 1 mm thick is adhered to the rear polycarbonate sheet, and carries a self-healing polyurethane coating.

18 Claims, 2 Drawing Sheets

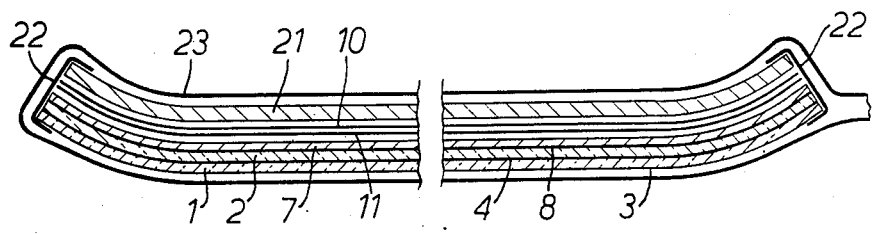
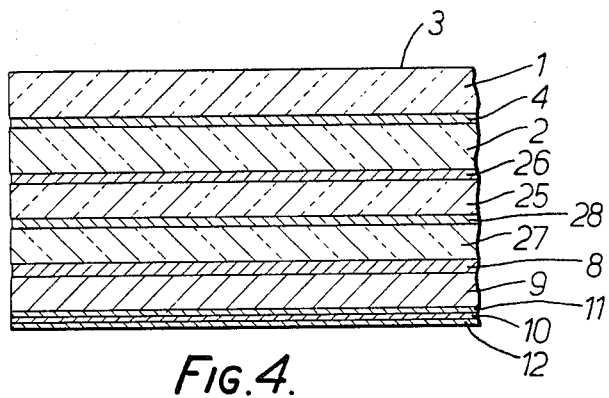

IMPACT-RESISTANT LAMINATE

CROSS REFERENCE TO RELATED APPLICATION

This application is a continuation-in-part of co-pending application Ser. No. 718,432 filed Apr. 1, 1985, now abandoned.

TECHNICAL FIELD

This invention relates to impact-resistant laminates and in particular to panels which resist bullets or similar high energy impacts and which comprise a front glass sheet which receives an impact and a rear polycarbonate sheet which contributes to the impact resistance and is also effective to reduce the risk of spalling from the rear face of the laminate.

BACKGROUND ART

GB No. 1 504 198 describes an impact resistant laminate comprising a number of glass sheets with a rear sheet made of polycarbonate of thickness in the range 0.76 mm to 5.6 mm having a brittle scratch-resistant coating on its exposed face, the thickness of which coating is up to 0.05 mm. The tendency of the polycarbonate sheet to spall, due to some extent to the brittle nature of the protective layer, is said to be reduced by reducing the thickness of the polycarbonate sheet to a thickness in the range 0.76 to 5.6 mm, and the results given indicate that under certain conditions of "medium power" impact, the laminate functions satisfactorily.

The use of a brittle abrasion-resistant coating on the rear polycarbonate sheet has been found to give rise to a further problem due to the incidence of minute cracks or crazing, which may extend through both the rear polycarbonate sheet and the brittle coating; perhaps due to the detrimental effect of the hard, brittle coating on stress release after laminating.

In one proposal for overcoming the tendency of the polycarbonate sheet to spall, described in GB No. 2 011 836 A, the brittle coating on the rear polycarbonate sheet has been replaced by a coating of self-healing polyurethane. In this proposal however, when the laminate includes glass, the rear polycarbonate sheet of the window structure has not been laminated to the glass but rather is glazed in a common mounting with an air space separating the laminated safety glass from the polycarbonate. In one example a multiple glazing configuration comprises two glass sheets which are laminated together, with an air space of 0.8 mm between the glass laminate and a rear unit consisting of a polycarbonate sheet 9.5 mm thick which is coated on its rear face with a 0.25 mm layer of self-healing polyurethane. The relatively thick polycarbonate sheet acts to contain spalling of the glass under impact by medium power automatic bullets.

Some abrasion resistant and self-healing polyurethanes are described in GB No. 2 070 045 A.

A further problem exists when employing an abrasion-resistant, self-healing coating to provide the rearmost, or innermost, face of the laminate, in that it is difficult to apply a thin uniform coating of self-healing material to the rear polycarbonate sheet after laminating. If the self-healing coating were to be applied to the rear polycarbonate sheet before it is laminated to one other laminae of the unit, there is a risk to the integrity of that self-healing coating.

Further it has not been possible, hitherto, to provide a curved laminated security panel with such a rearmost self-healing coating. This is because it has not proved possible to preform to a required curved configuration, a polycarbonate sheet which is impact-resistant and is to be the rear polycarbonate sheet of the laminate and which has an abrasion-resistant, self-healing coating, without risk of damage to the self-healing coating, not least during eventual stress release in the finished product.

The inventor has found that a thin polycarbonate sheet up to about 1 mm thick, and for some applications not more than about 0.64 mm thick, can act as an effective spall-resistant rear lamina in bullet resistant windows which include a rear, impact-resistant polycarbonate sheet, and which have to be capable of resisting a number of bullet impacts without spalling from the inner rear face of the laminate.

Further the inventor has provided a solution to the problem of the effective application of an abrasion-resistant, self-healing coating to such a laminate, particularly when that laminate is curved, for example for use as a bullet-resistant windshield or rear light of an automobile.

In addition the invention enables a thin polycarbonate sheet to be used as a carrier for a self-healing polyurethane coating, which thin, flexible duplex material can be applied to a curved laminate without preforming.

The invention thus provides an economical method of protecting the rear face of a flat or curved, impact-resistant laminate from abrasion and environmental degradation.

SUMMARY

The invention provides an impact resistant laminate comprising a front glass sheet which receives an impact and a rear polycarbonate sheet to the rear face of which there is adhered a thin flexible polycarbonate sheet up to about 1mm thick having an abrasion-resistant self-healing coating.

Polycarbonate is a relatively expensive material and by employing a polycarbonate sheet up to about 1mm thick as the rearmost sheet of the laminate in use, it has been found possible to reduce the thickness of the rear polycarbonate sheet of the laminate without detriment to the impact resistance of the laminate or to the spall barrier afforded by the rearmost polycarbonate sheet of the laminate. For example in applications in which it was usual to employ as the rear lamina a polycarbonate sheet 6 mm thick, the Applicants have found it possible to reduce the thickness of that rear polycarbonate lamina to 4 mm. The saving in weight and cost can more than off-set the addition of the rearmost thin polycarbonate sheet. The thickness of the thin flexible polycarbonate sheet may be in the range of about 0.25 mm to about 0.64 mm.

In one embodiment of the invention for use as a bullet-resistant window panel for a vehicle the invention provides a laminate comprising at least two and up to four sheets of annealed glass bonded together by polyvinylbutyral interlayers, with the rear polycarbonate sheet bonded to the rear glass face, and the thin polycarbonate sheet with its self-healing coating adhered to the rear polycarbonate sheet.

When employing the invention in the construction of aircraft windscreen panels the laminate may comprise a front sheet of toughened glass, and at least one sheet of polycarbonate bonded together by thermoplastic interlayers, with the thin polycarbonate sheet with its self-healing coating adhered to the rear polycarbonate sheet.

The self-healing outer coating carried by the thin polycarbonate sheet protects the polycarbonate from abrasion and environmental degradation. Preferably the self-healing coating is of self-healing polyurethane.

Preferably the thin polycarbonate sheet carrying its self-healing coating is adhered to the rear polycarbonate sheet by means of a thermoplastic polyurethane.

The invention further provides a curved laminated impact resistant panel comprising a front glass sheet which receives an impact and which is preformed to a predetermined curvature, a rear polycarbonate sheet which is preformed to a curved configuration which matches the configuration of the curved front glass sheet, and a self-healing coating which is carried by a thin flexible polycarbonate sheet which is adhered to the rearmost curved face of said rear polycarbonate sheet without preforming of said thin flexible polycarbonate sheet.

Still further the invention provides a method of producing a curved laminated impact resistant panel comprising laminating together a preformed curved glass sheet which is to be the impact-receiving front glass sheet of the panel and a preformed curved polycarbonate sheet whose curvature matches the curvature of said front glass sheet, which curved polycarbonate sheet is to be the rear sheet of the laminate; and applying a self-healing coating to said rear polycarbonate sheet by adhering to the preformed curved rear polycarbonate face of said rear polycarbonate sheet, a thin flexible polycarbonate sheet which carries said self-healing coating, without preforming said thin flexible polycarbonate sheet.

The thickness of the thin flexible polycarbonate sheet is not more than about 1 mm, preferably in the range of about 0.25 mm to about 1 mm. The self-healing polyurethane coating is preferably about 0.25 mm to about 0.5 mm thick.

BRIEF DESCRIPTION OF THE DRAWINGS

FIG. 3 illustrates diagrammatically one way of manufacturing a curved laminated bullet-resistant windshield, according to the invention, and FIG. 4 is a diagrammatic sectional view through one edge of another curved laminated security panel of the invention.

DETAILED DESCRIPTION

Figure 1:
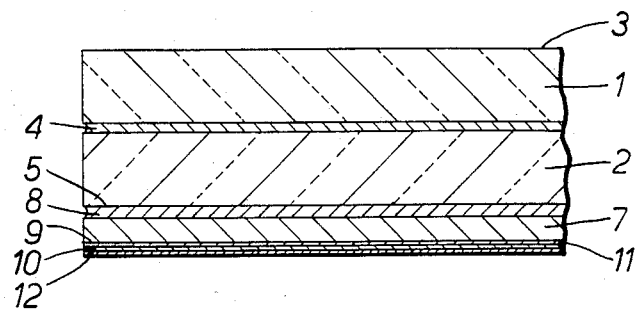
FIG. 1 is a section through one edge of one example of a bullet resistant laminate according to the invention.

Referring to FIG. 1 a bullet resistant laminate comprises two sheets 1 and 2 of annealed glass about 12 mm thick. The front glass sheet 1 receives an impact, for example from a bullet, on its front face 3. The sheets 1 and 2 are bonded together by an interlayer 4 of polyvinylbutyral which is about 1.5 mm thick. To the rear face 5 of the glass sheet 2, a rear polycarbonate sheet 7 is adhered by an interlayer 8 of thermoplastic polyester-based polyurethane 2 mm thick. The polycarbonate sheet 7 is about 4 mm thick.

A thin polycarbonate sheet 10, which is about 0.5 mm thick is adhered to the rear face 9 of the polycarbonate sheet 7, by a layer 11 of thermoplastic polyether-based polyurethane which is about 0.6 mm thick.

The thin polycarbonate sheet 10 carries an outer coating 12 of self-healing polyurethane, for example an abrasion-resistant polyurethane of the kind described in GB No. 2 011 836 A or GB No. 2 070 045 A. In this embodiment the outer coating 12 is about 0.5 mm thick, and imparts advantageous abrasion-resistance to the inner face of the laminate, in use, without detriment to the anti-spall properties of the thin polycarbonate sheet 10.

The reduction in thickness of the polycarbonate sheet 7 to a sheet about 4mm thick which carries the thin polycarbonate sheet 10, in this construction according to the invention, is not detrimental to the impact resistance of the laminate as a whole. Tests with a 7.62 Parker Hale T4 target rifle fired from a range of 30 m, showed that the laminate would resist two shots 25 cm apart without any danger of spalling, and a third shot was resisted without spalling although there could be a slight split in the polycarbonate sheet 10.

Figure 2:
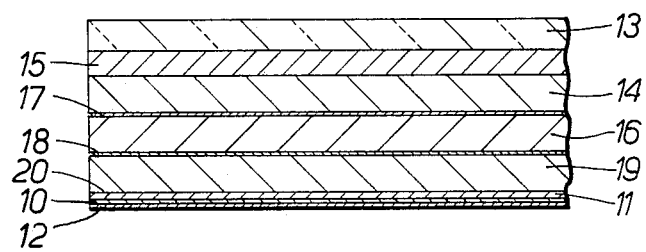
FIG. 2 is a similar sectional view through one edge of an aircraft windscreen panel.

FIG. 2 shows an aircraft windscreen panel constructed according to the invention which comprises a front sheet 13 of toughened glass about 5mm thick laminated to a polycarbonate sheet 14 which is about 6 mm thick, using a polyurethane interlayer 15 which is about 4 mm thick. Between the rear face of the polycarbonate sheet 14 and a second polycarbonate sheet 16, also about 6 mm thick, there is a polyurethane interlayer 17 which is about 0.5 mm thick. A further polyurethane interlayer 18 also about 0.5 mm thick bonds the rear face of the polycarbonate sheet 16 to a rear polycarbonate sheet 19 which is about 6 mm thick. To the rear face 20 of the rear polycarbonate sheet 19 there is adhered a thin polycarbonate sheet 10 which is about 0.5 mm thick, by a layer 11 of thermoplastic polyether-based polyurethane.

The thin polycarbonate sheet 10 carries an outer coating 12 of self-healing polyurethane which is about 0.5 mm thick. The use of the thin, coated polycarbonate sheet 10 adhered to the rear face of the laminate is an economical way of protecting the rear polycarbonate sheet 19 from environmental degradation and abrasion, and maintaining the impact-resistant properties of this aircraft windscreen panel.

The panel shown in FIG. 2 is a schematic illustration, not to scale, and as is well known, other elements such as electrical resistance heating films would be incorporated in the laminate.

In both these embodiments of FIGS. 1 and 2 the thin composite lamina comprising the thin polycarbonate sheet 10 with its outer coating 12 of self-healing polyurethane, which has been found to perform effectively as a spall barrier, may be in the form of a film about 1mm thick or less, and can be stored and supplied as a roll.

The polycarbonate of the composite lamina is preferably from about 0.25 mm to about 0.64 mm thick, and the coating of self-healing polyurethane is preferably from about 0.25 mm to about 0.50 mm thick.

In both embodiments of FIGS. 1 and 2, instead of using a thermoplastic polyurethane for the layer 11, a layer of another compatible adhesive may be used, for example a silicone resin adhesive. The use of the composite lamina 10, 12 has the advantage that this outer film can be applied to a preformed curved laminate without itself needing to be preformed. Because the rear thicker polycarbonate sheet 7 or 19 is uncoated it can be curved at elevated temperature to a predetermined form with less risk of spoiling the final appearance of the laminate. Moreover, an expensive outer coating on the rear thicker polycarbonate sheet 7 or 19 is not put at risk in a bending process at elevated temperature. The thin, flexible film is applied later as the outer layer and is simply adhered to the preformed rear polycarbonate sheet as a final step in the manufacture of the impact-resistant laminate.

FIG. 3 illustrates diagrammatically one way of manufacturing a curved laminated impact resistant panel for use as a bullet-proof windshield for an automobile. The laminate is as illustrated in FIG. 1.

The two sheets of annealed glass 1 and 2 which are about 12 mm thick are preformed conventionally to the required curvature as indicated diagrammatically in FIG. 3.

The rear polycarbonate sheet 7 is similarly preformed to a curvature which matches the curvature of the front glass sheet 1 and the second glass sheet 2.

Lamination then begins with the preformed front glass sheet 1 face-downwards. A sheet 4 of polyvinylbutyral about 1.5 mm thick is draped over the front glass sheet 1, and the second preformed glass sheet 2 is placed face-downwards on to the polyvinylbutyral interlayer 4. A sheet 8 of thermoplastic polyester-based polyurethane about 2mm thick is then draped over the second glass sheet 2, and the preformed rear polycarbonate sheet 7, which is about 4 mm thick, is then placed face-downwards on the polyurethane interlayer 2. The main preformed impact resistant constituents of the laminate have thus been assembled with their appropriate interlayer materials, and these constituents could then be laminated together to produce the main structure of the windshield before application of the thin flexible polycarbonate 10 carrying the self-healing coating 12.

In the preferred method, the thin flexible polycarbonate 10 carrying the self-healing coating 12, is applied by adhering to the preformed curved rear polycarbonate face of the rear polycarbonate sheet 7, during the lamination. The thin flexible polycarbonate sheet 10 is about 0.5 mm thick and the self-healing polyurethane coating 12 is about 0.5 mm thick.

Firstly, the sheet 11 of thermoplastic polyether-based polyurethane which is about 0.6 mm thick is draped over the preformed rear polycarbonate sheet 7. Then a sufficiently large thin flexible duplex sheet 10, 12 is cut from the roll, and is draped without preforming over the polyurethane adhesive sheet 11.

A tooling sheet 21, which is preformed to the appropriate windshield curvature, is then placed on to the composite lamina 10, 12 and the whole assembly is edge-taped as indicated at 22, and is placed in an airtight bag 23 and subjected to a vacuum in conventional manner.

The evacuated assembly is then autoclaved conventionally, for example for about 2 hours at a temperature of about 120° C. to 135° C. while a reduced pressure of about $6 \times 10^5$ Pa is maintained within the bag 23. The adhesion of the constituents of the panel occurs during this process, including the adhesion of the thin flexible polycarbonate sheet 10 to the preformed curved rear polycarbonate face of the rear polycarbonate sheet 7. This adhesion takes place without the introduction of any detrimental stress into the thin polycarbonate sheet 10, such as could otherwise be detrimental to the integrity both of the sheet 10 and the self-healing coating 12 which it carries, during the subsequent life of the bullet-proof windshield.

FIG. 4 illustrates another curved laminated security panel according to the invention which is for use as a bullet-proof windshield or rear light of a vehicle, and would be shaped similarly to the panel illustrated in FIG. 3.

The security panel of FIG. 4 comprises a preformed front sheet 1 of annealed glass which is about 8 mm thick and is adhered by a polyvinylbutyral interlayer 4 about 1.25 mm thick to a second preformed annealed glass sheet 2 which is also about 8 mm thick. A third preformed annealed glass sheet 25 about 6 mm thick is adhered to the sheet 2 by a polyvinylbutyral interlayer 26 about 1.25 mm thick, and a fourth preformed annealed glass sheet 27 about 6 mm thick is adhered to the third sheet 25 by a further polyvinylbutyral layer 28 which is also about 1.25 mm thick.

The glass sheets 1, 2, 25, and 27 are all preformed to the required matching curvature for the windshield or rear light, and are assembled together with their interlayers 4, 26 and 28 in the same way as described with reference to FIG. 3.

The preformed rear polycarbonate sheet 9, which is about 6mm thick and whose curvature matches the curvature of the front glass sheet 1, is adhered to the fourth glass sheet 27 by a polyurethane interlayer 8 which is about 2.5 mm thick. The polyurethane layer 11, which is about 0.4 mm thick, is then draped over the preformed rear polycarbonate sheet 9, and the composite lamina 10, 11 is draped over the top of the assembly, without preforming, before the assembly is topped with the tooling sheet 21, taped together and autoclaved. In this embodiment the composite lamina material comprises a polycarbonate sheet about 1 mm thick which carries a coating about 0.25 mm thick of self-healing polyurethane.

The resulting security automobile windshield or rear-light is effective to stop 5 shots within an 8.5 mm circle from a 7.62 Parker Hale T4 target rifle fired from a range of 30 m.

While some specific embodiments of this invention have been illustrated and described, it is understood that various modifications and changes will become obvious to those skilled in the art. Such modifications and changes may be made without departing from the true scope and spirit of this invention.

I claim:

1. An impact-resistant laminate comprising a front glass sheet which receives an impact and a rear polycarbonate sheet to the rear face of which there is adhered a thin polycarbonate sheet not more than about 0.64 mm thick having an abrasion-resistant self-healing coating of polyurethane.

2. An impact-resistant laminate comprising a front glass sheet which receives an impact and a rear polycarbonate sheet to the rear face of which there is adhered a thin polycarbonate sheet of thickness in the range about 0.25 mm to about 0.64 mm, which thin polycarbonate sheet has a self-healing coating of polyurethane.

3. A laminate according to claim 1 or claim 2, wherein the thin polycarbonate sheet is adhered to the rear polycarbonate sheet by means of a thermoplastic polyurethane.

4. An impact-resistant laminate comprising at least two sheets of annealed glass bonded together by a polyvinylbutyral interlayer, the front glass sheet of which receives an impact, a rear polycarbonate sheet bonded to the rear glass face of said sheets of annealed glass, and a thin polycarbonate sheet not more than about 0.64 mm thick adhered to the rear polycarbonate sheet, which thin polycarbonate sheet has an abrasion-resistant self-healing coating of polyurethane.

5. A laminate according to claim 4, wherein the thickness of the thin polycarbonate sheet is in the range about 0.25 mm to about 0.64 mm.

6. A laminate according to claim 4 or claim 5, wherein the thin polycarbonate sheet is adhered to the rear polycarbonate sheet by means of a thermoplastic polyurethane.

7. An impact-resistant laminate comprising a front sheet of toughened glass which receives an impact and at least one sheet of polycarbonate, thermoplastic interlayers bonding those sheets, a thin polycarbonate sheet not more than about 0.64 mm thick adhered to the rear face of the rear polycarbonate sheet, and an abrasion-resistant self-healing coating of polyurethane on the thin polycarbonate sheet.

8. A laminate as claimed in claim 7, wherein the thickness of the thin polycarbonate sheet is in the range about 0.25 mm to about 0.64 mm.

9. A laminate according to claim 7 or claim 8, wherein the thin polycarbonate sheet is adhered to the rear polycarbonate sheet by means of a thermoplastic polyurethane.

10. A curved laminated impact resistant panel comprising:
a front glass sheet which receives an impact and which is preformed to a predetermined curvature,
a rear polycarbonate sheet which is preformed to a curved configuration which matches the configuration of the curved front glass sheet, and
a self-healing coating of polyurethane which is carried by a thin flexible polycarbonate sheet which is adhered to the rearmost curved face of said rear polycarbonate sheet without preforming of said thin flexible polycarbonate sheet.

11. A curved laminated impact resistant panel as claimed in claim 10, further comprising an intermediate glass sheet which is preformed to a configuration matching said front glass sheet and bonded thereto by a polyvinylbutyral interlayer, and wherein said preformed rear polycarbonate sheet is bonded to said intermediate glass sheet by a polyurethane interlayer, and said thin flexible polycarbonate sheet with its outer self-healing coating of polyurethane is a film up to about 1 mm thick.

12. A curved laminated impact resistant panel as claimed in claim 11, wherein the thickness of said self-healing polyurethane coating is about 0.5 mm, and said thin flexible polycarbonate sheet is about 0.5 mm thick.

13. A curved laminated impact resistant panel as claimed in claim 10, wherein said thin flexible polycarbonate sheet with its outer self-healing coating of polyurethane is a film up to about 1 mm thick.

14. A curved laminated impact resistant panel as claimed in claim 13, wherein the thickness of said self-healing polyurethane coating is in the range of about 0.25 mm to about 0.5 mm.

15. A curved laminated security panel comprising:
a front glass sheet which receives an impact and which is preformed to a predetermined curvature,
a rear polycarbonate sheet which is preformed to a configuration matching the front glass sheet, and
a self-healing polyurethane coating which is carried by a polycarbonate sheet and is adhered to the rearmost curved face of said rear polycarbonate sheet without preforming of said thick polycarbonate sheet, the polycarbonate sheet with its outer self-healing coating of polyurethane being a film about 1 mm thick.

16. A curved laminated security panel as claimed in claim 15, wherein said self-healing polyurethane coating is from about 0.25 mm to about 0.50 mm thick.

17. A method of producing a curved laminated impact resistant panel wherein a preformed curved glass sheet which is to be the impact-receiving front glass sheet of the panel is laminated with a preformed curved polycarbonate sheet whose curvature matches the curvature of said front glass sheet, which curved polycarbonate sheet is to be the rear sheet of the laminate, comprising applying a self-healing coating of polyurethane to said rear polycarbonate sheet by adhering to the preformed curved rear polycarbonate face of said rear polycarbonate sheet, a thin flexible polycarbonate sheet which carries said self-healing coating, without preforming said thin flexible polycarbonate sheet.

18. A method as claimed in claim 17, wherein said thin flexible polycarbonate sheet with its outer self-healing coating of polyurethane is a film up to about 1 mm thick.

* * * * *